(12) United States Patent
Tabata et al.

(10) Patent No.: US 12,391,144 B2
(45) Date of Patent: Aug. 19, 2025

(54) SERVER, CONTROL DEVICE, AND STORAGE MEDIUM

(71) Applicant: TOYOTA JIDOSHA KABUSHIKI KAISHA, Toyota (JP)

(72) Inventors: Mitsuhiro Tabata, Sunto-gun (JP); Motoki Takahashi, Susono (JP); Naofumi Magarida, Sunto-gun (JP); Yuko Azuma, Numazu (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 543 days.

(21) Appl. No.: 17/884,763

(22) Filed: Aug. 10, 2022

(65) Prior Publication Data

US 2023/0065192 A1   Mar. 2, 2023

(30) Foreign Application Priority Data

Sep. 1, 2021   (JP) ................... 2021-142510

(51) Int. Cl.
  *B60L 55/00*   (2019.01)
  *G01C 21/34*   (2006.01)
  *H02J 3/32*    (2006.01)

(52) U.S. Cl.
  CPC .......... *B60L 55/00* (2019.02); *G01C 21/3469* (2013.01); *G01C 21/3492* (2013.01); *H02J 3/322* (2020.01)

(58) Field of Classification Search
  CPC .......... B60L 53/62; B60L 53/63; B60L 53/65; B60L 53/66; B60L 53/68; G01C 21/3469; G01C 34/3492; H02J 3/003; H02J 3/322

USPC ................. 700/286, 291, 295, 297
See application file for complete search history.

(56) References Cited

U.S. PATENT DOCUMENTS

| | | | | |
|---|---|---|---|---|
| 7,120,520 B2* | 10/2006 | Seto | .......... | G06Q 50/06 |
| | | | | 700/297 |
| 8,103,386 B2* | 1/2012 | Ichikawa | ........ | H02J 3/003 |
| | | | | 700/297 |
| 8,768,533 B2* | 7/2014 | Ichikawa | ........ | H04L 25/028 |
| | | | | 701/1 |
| 9,866,032 B2* | 1/2018 | Niizuma | ......... | B60L 53/65 |
| 10,536,029 B2* | 1/2020 | Tamura | ........... | H02J 9/061 |
| 11,884,178 B2* | 1/2024 | Salter | ............. | H02J 3/322 |
| 2022/0379768 A1* | 12/2022 | Hoki | ............... | B60L 53/36 |
| 2022/0379907 A1* | 12/2022 | Kazuno | ........... | B60L 53/68 |
| 2023/0061632 A1* | 3/2023 | Tabata | ............ | B60L 53/62 |

FOREIGN PATENT DOCUMENTS

| JP | 2010186238 A | * | 8/2010 |
|---|---|---|---|
| JP | 2017112806 A | * | 6/2017 |
| JP | 2019-146436 A | | 8/2019 |

(Continued)

*Primary Examiner* — Crystal J Barnes-Bullock
(74) *Attorney, Agent, or Firm* — Oblon, McClelland, Maier & Neustadt, L.L.P.

(57) ABSTRACT

A server includes a processor configured to: acquire electric power supply information indicating electric energy that is suppliable by each of a plurality of vehicles to outside; set electric energy to be supplied to a facility by each of the vehicles based on the electric power supply information of each of the vehicles; and cause each of the vehicles to supply electric power based on the set electric energy of each of the vehicles.

14 Claims, 6 Drawing Sheets

(56) References Cited

FOREIGN PATENT DOCUMENTS

| JP | 2020-077221 | A | | 5/2020 | |
|----|-------------|---|---|--------|---|
| JP | 2020114051 | A | * | 7/2020 | |
| JP | 2022181291 | A | * | 12/2022 | ............ B60W 20/20 |
| JP | 7542308 | B2 | * | 8/2024 | |
| JP | 7567699 | B2 | * | 10/2024 | ............ B60L 53/305 |

* cited by examiner

SERVER, CONTROL DEVICE, AND STORAGE MEDIUM

CROSS-REFERENCE TO RELATED APPLICATION

This application claims priority to Japanese Patent Application No. 2021-142510 filed on Sep. 1, 2021, incorporated herein by reference in its entirety.

BACKGROUND

1. Technical Field

The present disclosure relates to a server, a control device, and a storage medium.

2. Description of Related Art

In Japanese Unexamined Patent Application Publication No. 2020-077221 (JP 2020-077221 A), a technology in which, when electric power is supplied using a plurality of vehicles such as hybrid electric vehicles (HEVs), electric power is generated by an engine to meet the power demand of a facility that exceeds the electric power supply capacity of a power storage device mounted on each vehicle is disclosed.

SUMMARY

However, in the above-mentioned JP 2020-077221 A, there is a difference in the electric power supply capacity of the vehicles for supplying electric power. Therefore, there may be a case where some vehicles run out of electric power during electric power supply, and thus an operation to connect a new vehicle occurs every time the vehicle runs out of electric power, which hinders effective electric power supply to the facility.

The present disclosure has been made in view of the above, and it is an object of the present disclosure is to provide a server, a control device, and a storage medium capable of efficiently supplying electric power to a facility using a plurality of vehicles.

In order to solve the above-mentioned issue and achieve the object, a server according to the present disclosure includes a processor configured to: acquire electric power supply information indicating electric energy that is suppliable by each of a plurality of vehicles to outside; set electric energy to be supplied to a facility by each of the vehicles based on the electric power supply information of each of the vehicles; and cause each of the vehicles to supply electric power based on the electric energy.

Further, a control device according to the present disclosure includes a processor configured to: acquire electric power supply information indicating electric energy that is suppliable by each of a plurality of vehicles to outside; set electric energy to be supplied to a facility by each of the vehicles based on the electric power supply information of each of the vehicles; and cause each of the vehicles to supply electric power based on the electric energy.

Further, a storage medium program according to the present disclosure stores a program that causes a processor to: acquire electric power supply information indicating electric energy that is suppliable by each of a plurality of vehicles to outside; set electric energy to be supplied to a facility by each of the vehicles based on the electric power supply information of each of the vehicles; and cause each of the vehicles to supply electric power based on the electric energy.

According to the present disclosure, an effect that electric power can be effectively supplied to the facility using the vehicles is achieved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
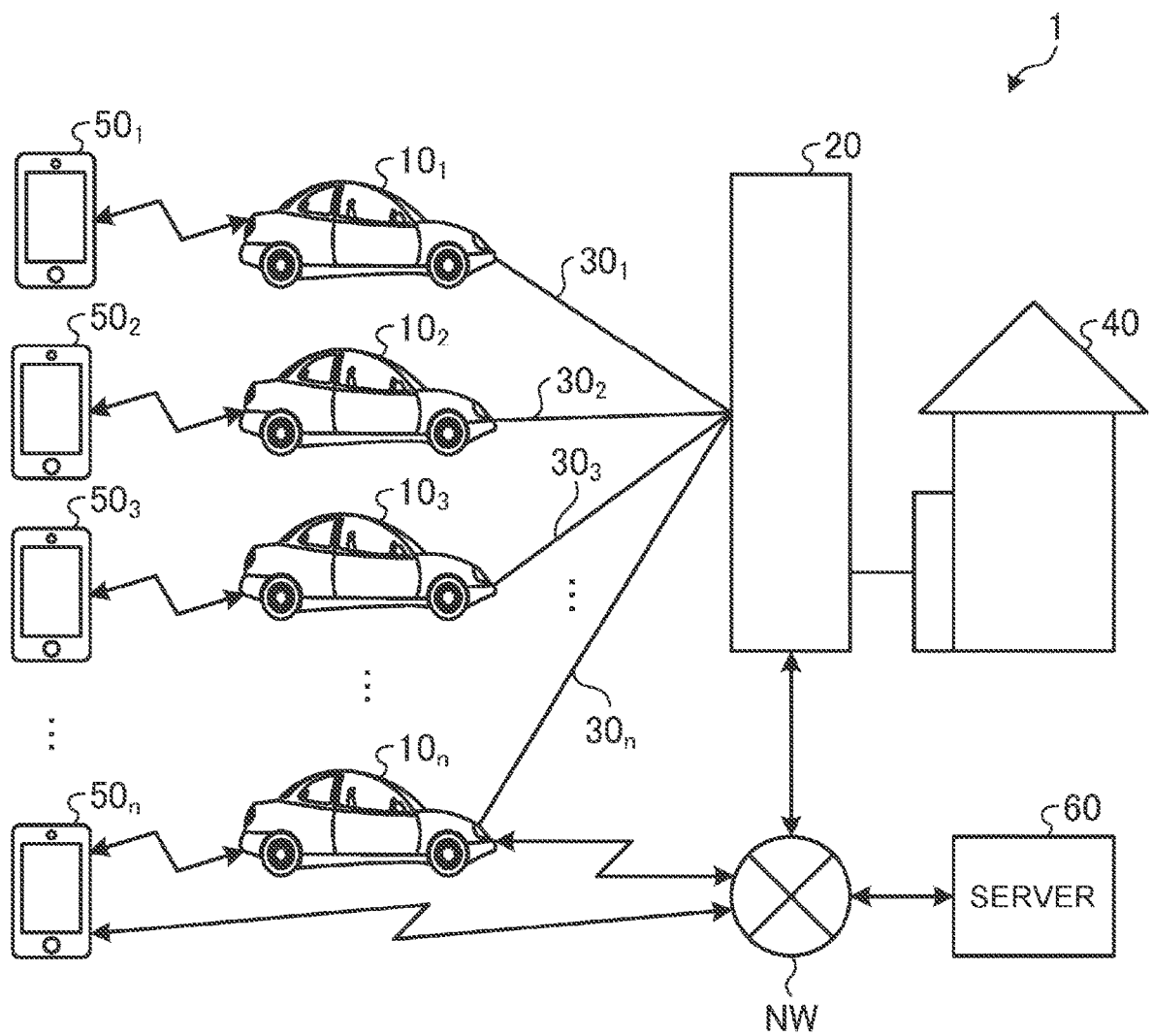
FIG. 1 is a diagram showing a schematic configuration of an electric power system according to a first embodiment.

Hereinafter, a server, a control device, and a storage medium according to embodiments of the present disclosure will be described with reference to the drawings. Note that, the embodiments below do not limit the present disclosure. Further, in the following, the same portions will be described with the same reference numerals.

First Embodiment

Outline Configuration of Electric Power System

FIG. 1 is a diagram showing a schematic configuration of an electric power system according to a first embodiment. An electric power system 1 shown in FIG. 1 includes a plurality of vehicles $10_1$ to $10_n$ (an integer of n=4 or more) (hereinafter, simply referred to as a "vehicle 10" when referring to any of the vehicles $10_1$ to $10_n$), a charge-discharge device 20, a plurality of charge-discharge cables $30_1$ to $30_n$ (hereinafter, simply referred to as "charge-discharge cable 30" when referring to any of the charge-discharge cables $30_1$ to $30_n$), a facility 40, a plurality of communication terminals $50_1$ to $50_n$ (an integer of n=4 or more) (hereinafter, simply referred to as a "communication terminal 50" when referring to any of communication terminals $50_1$ to $50_n$), and a server 60 that can communicate with the charge-discharge device 20, the vehicles 10, and the communication terminals 50 via a network NW. The network NW is composed of, for example, the Internet network and a mobile phone network.

Note that FIG. 1 describes a case where the vehicles $10_1$ to $10_n$ supply (discharge) alternating current (AC) power to the facility 40. Further, with reference to FIG. 1, a case where the vehicles $10_1$ to $10_n$ are electrically connected to one charge-discharge device 20 in a parallel state will be described. However, the present disclosure is not limited to this, and can be applied to a case where the charge-discharge device 20 is provided for each of the vehicles $10_1$ to $10_n$ (that is, four charge-discharge devices 20 are provided). As a matter of course, the present disclosure can also be applied to a case where the vehicles $10_1$ to $10_n$ are electrically connected to one charge-discharge device 20 in a series state, and a case where the vehicles $10_1$ to $10_n$ are electrically connected in combination of a series state and a parallel state. Further, FIG. 1 describes a case where the facility 40 is provided at only one location. However, the present disclosure is not limited to this, and power supply from the vehicles 10 to each of a plurality of the facilities 40 in the disaster area or the power failure area is scheduled, and the facilities 40 are connected to the server 60 via the network NW.

The vehicle 10 is realized using any of a hybrid electric vehicle (HEV), a plug-in hybrid electric vehicle (PHEV), a fuel cell electric vehicle (FCEV), and a battery electric vehicle (BEV). The vehicle 10 is electrically connected to the charge-discharge device 20 via the charge-discharge cable 30. The vehicle 10 supplies (discharges) electric power to an electric load in the facility 40 via the charge-discharge cable 30 and the charge-discharge device 20. Further, the vehicle 10 charges a secondary battery mounted therein with the electric power supplied from the facility 40 via the charge-discharge cable 30 and the charge-discharge device 20. Further, when the vehicle 10 is provided with an electric power generation function such as HEV, PHEV, and FCEV, the generated electric power is supplied (discharged) to the electric load in the facility 40 via the charge-discharge cable 30 and the charge-discharge device 20.

The charge-discharge device 20 is provided between the charge-discharge cable 30 and the facility 40. The charge-discharge device 20 electrically connects the vehicles 10 that are connected in parallel via the charge-discharge cables 30 and the facility 40. The charge-discharge device 20 converts the electric power supplied from the facility 40 into a predetermined voltage value and supplies the converted voltage value to the vehicles 10 connected in parallel via the charge-discharge cables 30. Further, the charge-discharge device 20 converts the electric power supplied (discharged) from the vehicles 10 connected in parallel via the charge-discharge cables 30 into a predetermined voltage value and supplies the converted voltage value to the facility 40.

The facility 40 receives the electric power supplied from the vehicles 10 via the charge-discharge device 20, and also receives commercial system electric power from an electric power transmission line or the like. Further, the facility 40 supplies the electric power supplied by the facility 40 to the vehicles 10 via the charge-discharge device 20.

The communication terminal 50 is communicably connected to the vehicle 10 in accordance with a predetermined communication standard, and receives various types of information related to the vehicle 10. In the following, the communication terminal 50 will be described as a mobile phone. However, the present disclosure is not limited to this, and the communication terminal 50 can be applied to, for example, a tablet terminal provided with a display monitor, a wearable device, and the like. Further, the predetermined communication standard is Wi-Fi (registered trademark), Bluetooth (registered trademark), or the like.

The server 60 communicates with the charge-discharge device 20, the vehicle 10, and the communication terminals 50 via the network NW, and controls the electric energy supplied by each of the vehicles $10_1$ to $10_n$.

Functional Configuration of Electric Power System

Figure 2:
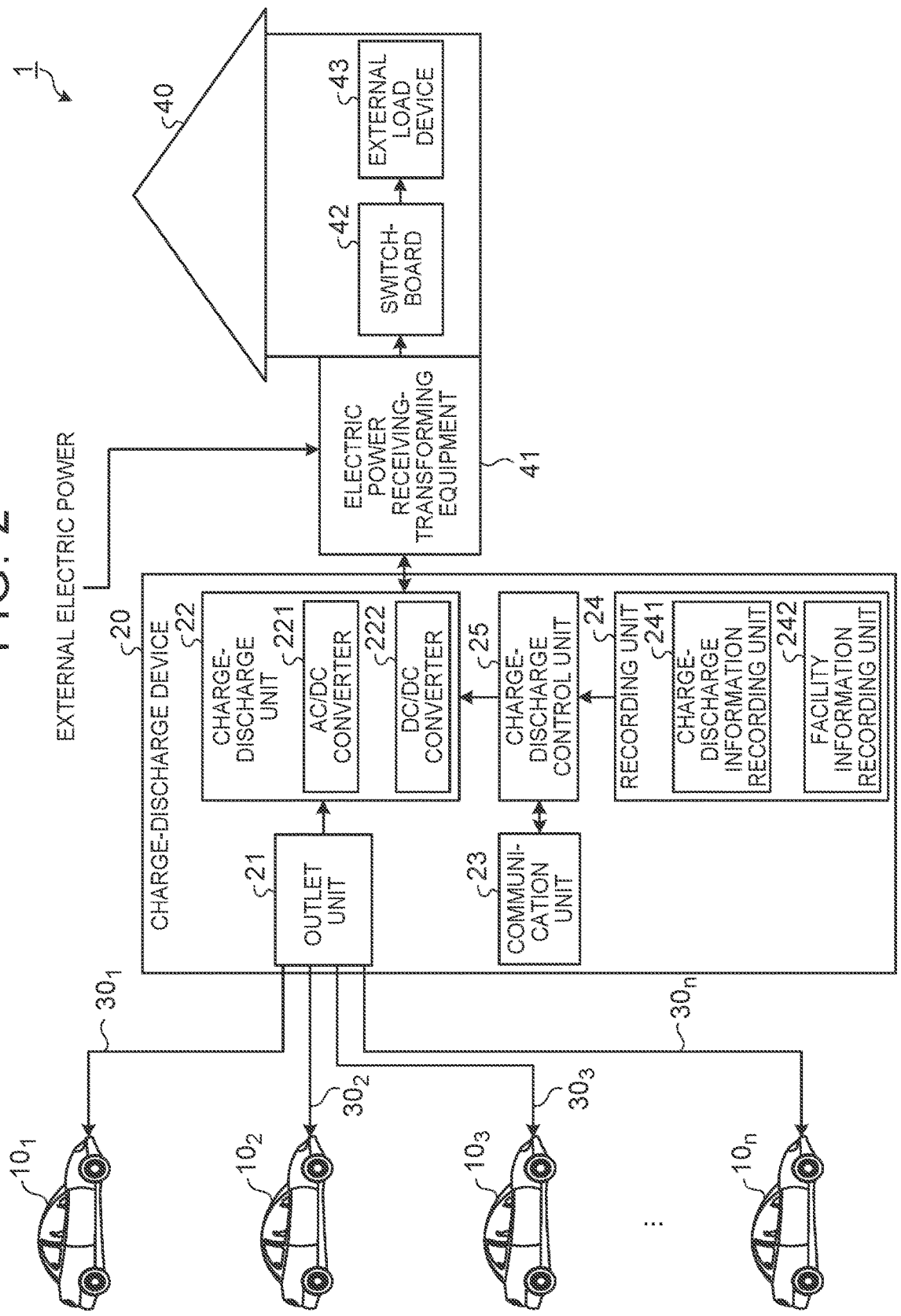
FIG. 2 is a block diagram showing a functional configuration of a charge-discharge device and a facility in the electric power system according to the first embodiment.

Next, the functional configuration of the electric power system 1 will be described. FIG. 2 is a block diagram showing the functional configuration of the charge-discharge device 20 and the facility 40 in the electric power system 1. The configuration of the vehicle 10 will be described below.

Functional Configuration of Charge-Discharge Device

First, the functional configuration of the charge-discharge device 20 will be described. As shown in FIG. 2, the charge-discharge device 20 includes an outlet unit 21, a charge-discharge unit 22, a communication unit 23, a recording unit 24, and a charge-discharge control unit 25.

Each plug of the charge-discharge cables 30 is electrically connected to one end of the outlet unit 21 (an electric outlet), and the other end of the outlet unit 21 is electrically connected to the charge-discharge unit 22 and the communication unit 23. The outlet unit 21 includes multiple outlets into which the plugs of the charge-discharge cables 30 can be inserted.

One end of the charge-discharge unit 22 is electrically connected to the outlet unit 21, and the other end is electrically connected to electric power receiving-transforming equipment 41 of the facility 40 described later. Under the control of the charge-discharge control unit 25, the charge-discharge unit 22 supplies electric power from the electric power receiving-transforming equipment 41 of the facility 40 to the vehicle 10 via the outlet unit 21 and the charge-discharge cable 30. Further, under the control of the charge-discharge control unit 25, the charge-discharge unit 22 supplies electric power from the vehicles 10 to the electric power receiving-transforming equipment 41 via the outlet unit 21 and the charge-discharge cables 30. The charge-discharge unit 22 includes at least an alternating current (AC)/direct current (DC) converter 221 capable of bidirectionally converting AC power and DC power, and a DC/DC converter 222 capable of bidirectionally converting DC power.

Under the control of the charge-discharge control unit 25, the AC/DC converter 221 converts the AC power supplied from the electric power receiving-transforming equipment 41 into DC power and outputs the converted DC power to the DC/DC converter 222. Further, under the control of the charge-discharge control unit 25, the AC/DC converter 221 converts the DC power input from the DC/DC converter 222 into AC power and outputs the converted AC power to the electric power receiving-transforming equipment 41.

Further, under the control of the charge-discharge control unit 25, the DC/DC converter 222 converts the DC power input from the AC/DC converter 221 into a predetermined voltage value and outputs the converted voltage value to the outlet unit 21. Further, under the control of the charge-discharge control unit 25, the DC/DC converter 222 converts the DC power input from the outlet unit 21 into a predetermined voltage value and outputs the converted voltage value to the AC/DC converter 221.

The communication unit 23 receives control area network (CAN) data of the vehicle 10 and various types of information related to the vehicle 10 input via the charge-discharge cable 30 and the outlet unit 21, and outputs the received various types of information to the charge-discharge control unit 25. Further, the communication unit 23 transmits various types of information from the charge-discharge control unit 25 to the vehicle 10 via the charge-discharge cable 30 and the outlet unit 21. Further, the communication unit 23 communicates with an external server or the like via a public communication network such as the Internet (not shown) or a network such as a mobile phone communication network.

The recording unit 24 records various types of information related to the charge-discharge device 20. Further, the recording unit 24 includes a charge-discharge information recording unit 241 that records charge-discharge information and a facility information recording unit 242 that indicates an importance of the facility 40. Here, the charge-discharge information includes the number of outlets of the outlet unit 21, the number of charge-discharge cables 30 accommodated in the charge-discharge device 20, the type of charge-discharge cables 30, the length of each charge-discharge cable 30, standard information of the outlets, a suppliable voltage value, etc. The importance is a value set in advance to each facility 40. For example, when the facility 40 is an important base in the case of an emergency or disaster, such as a hospital or a city hall, a higher value is set to the facility 40 as compared with other bases such as a public hall or a school. The recording unit 24 is configured using a dynamic random access memory (DRAM), a read-only memory (ROM), a flash memory, a hard disk drive (HDD), a solid state drive (SSD), and the like.

The charge-discharge control unit 25 is configured using a memory and a processor provided with hardware such as a digital signal processor (DSP), a field-programmable gate array (FPGA) or a central processing unit (CPU). The charge-discharge control unit 25 controls each unit constituting the charge-discharge device 20.

Functional Configuration of Facility

Next, the functional configuration of the facility 40 will be described. The facility 40 includes the electric power receiving-transforming equipment 41, a switchboard 42, and an external load device 43.

The electric power receiving-transforming equipment 41 receives external electric power transmitted from the outside, converts the received external electric power into a predetermined voltage value or the like, and supplies the converted voltage value to the switchboard 42 and the charge-discharge device 20. Further, the electric power receiving-transforming equipment 41 receives the electric power supplied (discharged) from the vehicles 10 via the charge-discharge device 20, and supplies the received electric power to the switchboard 42.

The switchboard 42 is electrically connected to an outlet (not shown) provided in the facility 40, and distributes AC power supplied from the electric power receiving-transforming equipment 41 to the external load device 43.

The external load device 43 is an instrument that consumes electric power. Specifically, the external load device 43 is, for example, a lighting fixture, a storage battery, an elevator, a home electric appliance, a communication device, or the like.

Functional Configuration of Vehicle

Figure 3:
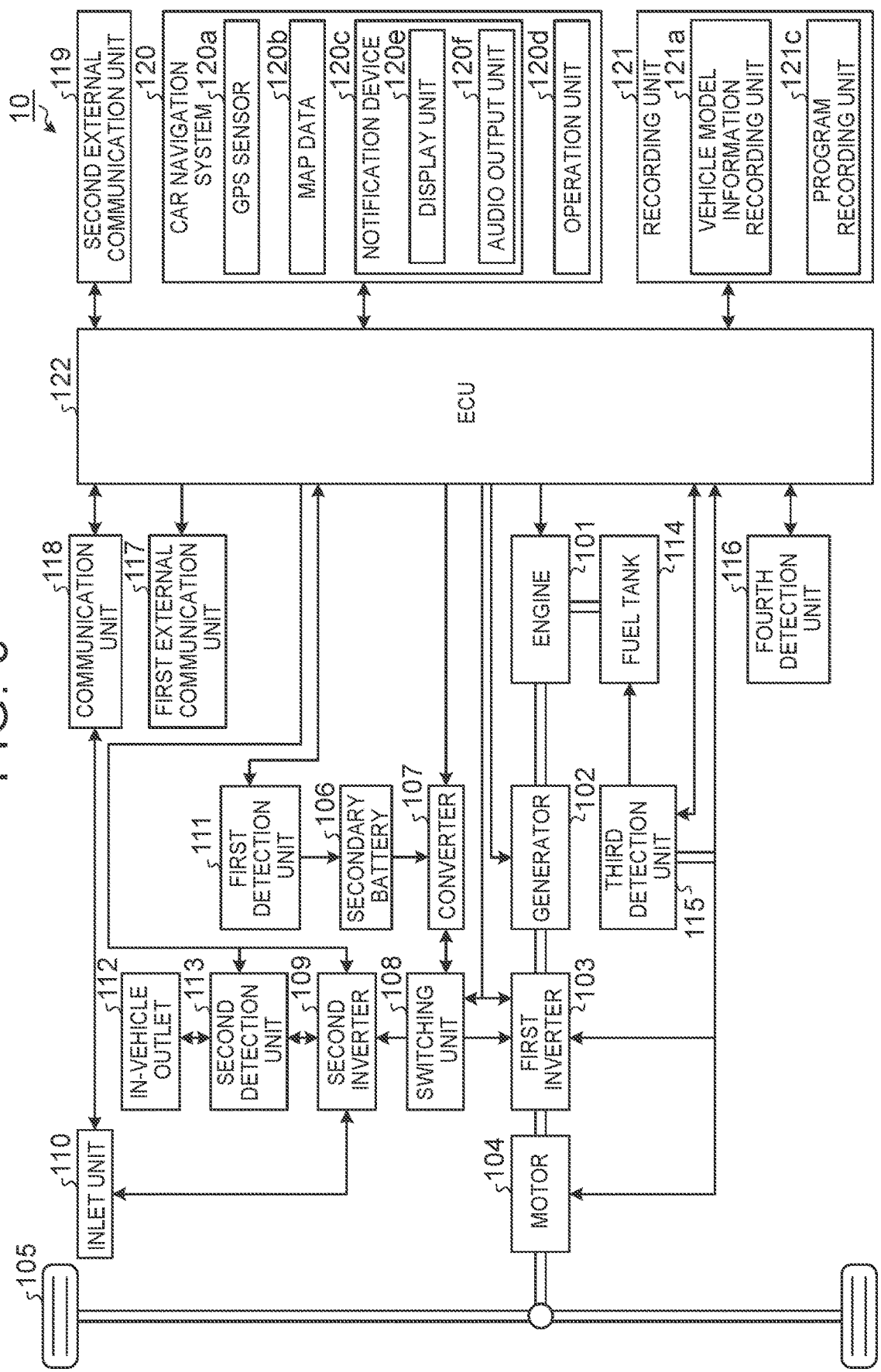
FIG. 3 is a block diagram showing a functional configuration of a vehicle according to the first embodiment.

Next, the detailed functional configuration of the vehicle 10 will be described. FIG. 3 is a block diagram showing the functional configuration of the vehicle 10.

As shown in FIG. 3, the vehicle 10 includes an engine 101, a generator 102, a first inverter 103, a motor 104, drive wheels 105, a secondary battery 106, a converter 107, a switching unit 108, a second inverter 109, an inlet unit 110, a first detection unit 111, an in-vehicle outlet 112, a second detection unit 113, a fuel tank 114, a third detection unit 115, a fourth detection unit 116, a first external communication unit 117, a communication unit 118, a second external communication unit 119, a car navigation system 120, a recording unit 121, and an electric control unit (ECU) 122.

The engine 101 is composed of a known internal combustion engine, and outputs power using fuel stored in the fuel tank 114. The engine 101 is driven under the control of the ECU 122. The power output from the engine 101 drives the generator 102.

The generator 102 is electrically connected to the motor 104 via the first inverter 103. Under the control of the ECU 122, the generator 102 supplies the generated AC power to the secondary battery 106 via the switching unit 108 and the converter 107. The generator 102 is configured using an electric power generation motor generator provided with a motor function in addition to an electric power generation function.

Under the control of the ECU 122, the first inverter 103 converts the discharge power (DC power) from the secondary battery 106 supplied via the switching unit 108 and the converter 107 into the AC power, and supplies the converted AC power to the motor 104. Further, under the control of the ECU 122, the first inverter 103 converts the AC power generated by the motor 104 into the DC power at the time of regenerative braking of the vehicle 10, and supplies the converted DC power to the secondary battery 106 via the switching unit 108 and the converter 107. The first inverter 103 is configured using, for example, a three-phase inverter circuit including a bridge circuit including switching elements for three phases.

Under the control of the ECU 122, the motor 104 is driven by the AC power supplied from the first inverter 103 when the vehicle 10 is accelerated. The power output from the motor 104 drives the drive wheels 105. Further, under the control of the ECU 122, the motor 104 functions as a generator that generates electric power by an external force transmitted from the drive wheels 105 when the vehicle 10 is braked, and the generated electric power is supplied from the first inverter 103 to the secondary battery 106 via the switching unit 108 and the converter 107. The motor 104 is configured using a driving motor generator provided with the motor function in addition to the electric power generation function.

The secondary battery 106 is configured using, for example, a chargeable and dischargeable storage battery such as a nickel hydrogen battery or a lithium ion battery, or an electric power storage element such as an electric double layer capacitor. The secondary battery 106 can be charged and discharged by the converter 107, and stores high-voltage DC power.

One end of the converter 107 is electrically connected to the secondary battery 106, and the other end is electrically connected to one of the first inverter 103 and the second inverter 109 via the switching unit 108. The converter 107 charges and discharges the secondary battery 106 under the control of the ECU 122. Specifically, when the secondary battery 106 is charged, the converter 107 steps down the DC power that is supplied from the outside via the second inverter 109, the inlet unit 110, and the switching unit 108 to a predetermined voltage, and the stepped-down charging current is supplied to the secondary battery 106. On the other hand, when the secondary battery 106 is discharged, the converter 107 boosts the voltage of the DC power from the secondary battery 106, and the boosted discharge current is supplied to the first inverter 103 via the switching unit 108.

One end of the switching unit 108 is electrically connected to the converter 107, and the other end is electrically connected to one of the first inverter 103 and the second inverter 109. Under the control of the ECU 122, the switching unit 108 electrically connects the converter 107 and one of the first inverter 103 and the second inverter 109. The switching unit 108 is configured using a mechanical relay, a semiconductor switch, or the like.

One end of the second inverter 109 is electrically connected to the switching unit 108, and the other end is electrically connected to the inlet unit 110 or the in-vehicle outlet 112. Under the control of the ECU 122, the second inverter 109 converts the discharge power (DC power) supplied from the secondary battery 106 via the switching unit 108 and the converter 107 into the AC power, and supplies the converted AC power to the inlet unit 110. Specifically, under the control of the ECU 122, the second inverter 109 supplies the AC power to the outside via the inlet unit 110 and a charge-discharge cable (not shown). The second inverter 109 is configured using a single-phase inverter circuit or the like so as to correspond to the form of electric power used externally.

One end of the inlet unit 110 is electrically connected to the second inverter 109. A charge-discharge cable (not shown) is detachably connected to the inlet unit 110. The inlet unit 110 supplies the AC power that is supplied from the outside to the second inverter 109 via the charge-discharge cable, and outputs various types of information including control signals and the like that are input from the outside to the communication unit 118. Further, the inlet unit 110 supplies the AC power supplied from the second inverter 109 via the charge-discharge cable to the outside, and outputs various types of information including control signals and the like that are input from the ECU 122 via the communication unit 118 to the outside.

The first detection unit 111 detects each of a state of charge (SOC: charging rate), a temperature, a state of health (SOH), a voltage value, and a current value of the secondary battery 106, and outputs the detection results to the ECU 122. The first detection unit 111 is configured using an ammeter, a voltmeter, a temperature sensor, and the like.

The in-vehicle outlet 112 is electrically connected to the second inverter 109. A power plug of a general electric appliance can be connected to the in-vehicle outlet 112. The AC power supplied from the second inverter 109 is supplied to the electric appliance of which power plug is connected.

The second detection unit 113 is provided between the in-vehicle outlet 112 and the second inverter 109, detects at least one of power consumption and a current value of the electric appliance connected to the in-vehicle outlet 112, and outputs the detection result to the ECU 122. The second detection unit 113 is configured using a wattmeter, an ammeter, a voltmeter, and the like.

The fuel tank 114 stores fuel supplied to the engine 101. Here, the fuel is a fossil fuel such as gasoline. Note that, when the vehicle 10 is an FCEV, hydrogen fuel is stored.

The third detection unit 115 detects the remaining amount of fuel stored in the fuel tank 114, and outputs the detection result to the ECU 122. The third detection unit 115 is configured using a fuel gauge or the like.

The fourth detection unit 116 detects state information of the vehicle 10 and outputs the detection result to the ECU 122. Here, the state information is acceleration, an inclination angle, a speed, and the like of the vehicle 10. The fourth detection unit 116 is configured using an acceleration sensor, a speed sensor, a gyro sensor, and the like.

Under the control of the ECU 122, the first external communication unit 117 transmits various types of information input from the ECU 122 to a server (not shown) in accordance with a predetermined communication standard. Further, the first external communication unit 117 outputs the various types of information received from the server (not shown) to the ECU 122. Here, the predetermined communication standard is a communication standard such as the fourth generation mobile communication system (4G), the fifth generation mobile communication system (5G), and the like. The first external communication unit 117 is configured using a communication module or the like.

The communication unit 118 receives a control signal including various types of information and input from the outside via the inlet unit 110, and outputs the received control signal to the ECU 122. Further, the communication unit 118 outputs a control signal including CAN data and the like input from the ECU 122 to the inlet unit 110. The communication unit 118 is configured using a communication module or the like.

Under the control of the ECU 122, the second external communication unit 119 transmits various types of information input from the ECU 122 to the communication terminal 50 in accordance with a predetermined wireless communication standard. Further, the second external communication unit 119 outputs various types of information received from the communication terminal 50 to the ECU 122. Here, the predetermined communication standard is at least one of Wi-Fi (registered trademark) and Bluetooth (registered trademark). The second external communication unit 119 is configured using a wireless communication module or the like.

The car navigation system 120 includes a global positioning system (GPS) sensor 120a, a map database 120b, a notification device 120c, and an operation unit 120d.

The GPS sensor 120a receives signals from a plurality of GPS satellites or transmission antennas, and calculates position information related to the position (longitude and latitude) of the vehicle 10 based on the received signals. The GPS sensor 120a is configured using a GPS receiving sensor or the like. In the first embodiment, the orientation accuracy of the vehicle 10 may be improved by mounting a plurality of the GPS sensors 120a.

The map database 120b stores various types of map data. The map database 120b is configured using a storage medium such as an HDD or an SSD.

The notification device 120c includes a display unit 120e that displays images, maps, videos, and character information, and an audio output unit 120f that generates sounds such as voices and alarm sounds. The display unit 120e is configured using a display such as a liquid crystal display or an organic electroluminescence (EL). The audio output unit 120f is configured using a speaker or the like.

The operation unit 120d receives an input of the operation by the user and outputs signals corresponding to the various received operation contents to the ECU 122. The operation unit 120d is realized using a touch panel, buttons, switches, a jog dial, and the like.

The car navigation system 120 configured as described above superimposes the position information related to the current position of the vehicle 10 acquired by the GPS sensor 120a on the map corresponding to the map data stored in the map database 120b, whereby the user is notified of information including the road on which the vehicle 10 is currently traveling and a traveling route to the destination using the display unit 120e and the audio output unit 120f.

The recording unit 121 records various types of information related to the vehicle 10. The recording unit 121 records CAN data of the vehicle 10 input from the ECU 122, data during various processes executed by the ECU 122, and the like. The recording unit 121 includes a vehicle model information recording unit 121a related to the vehicle 10, an electric power supply information recording unit that records electric power supply information indicating suppliable electric energy by the vehicle 10, and a program recording unit 121c that records various programs executed by the vehicle 10. Here, the vehicle model information includes a vehicle model of the vehicle 10, identification information for identifying the vehicle 10, a model year of the vehicle 10, presence or absence of the electric power generation function, information indicating any one of HEV, PHEV, FCEV, and BEV, and the like. The electric power supply information is suppliable electric energy (kilowatt (kW)) by the vehicle 10, a suppliable voltage (for example, 100 volts (V) or 200 V), a current value, the maximum capacity and the maximum electric power generation amount (kilowatt per hour (kWh)) of the secondary battery 106, and the like. The recording unit 121 is configured using a DRAM, a ROM, a flash memory, an SSD, or the like.

The ECU 122 is configured using a memory and a processor provided with hardware such as a CPU. The ECU 122 controls the operation of each unit constituting the vehicle 10.

Functional Configuration of Server

Figure 4:
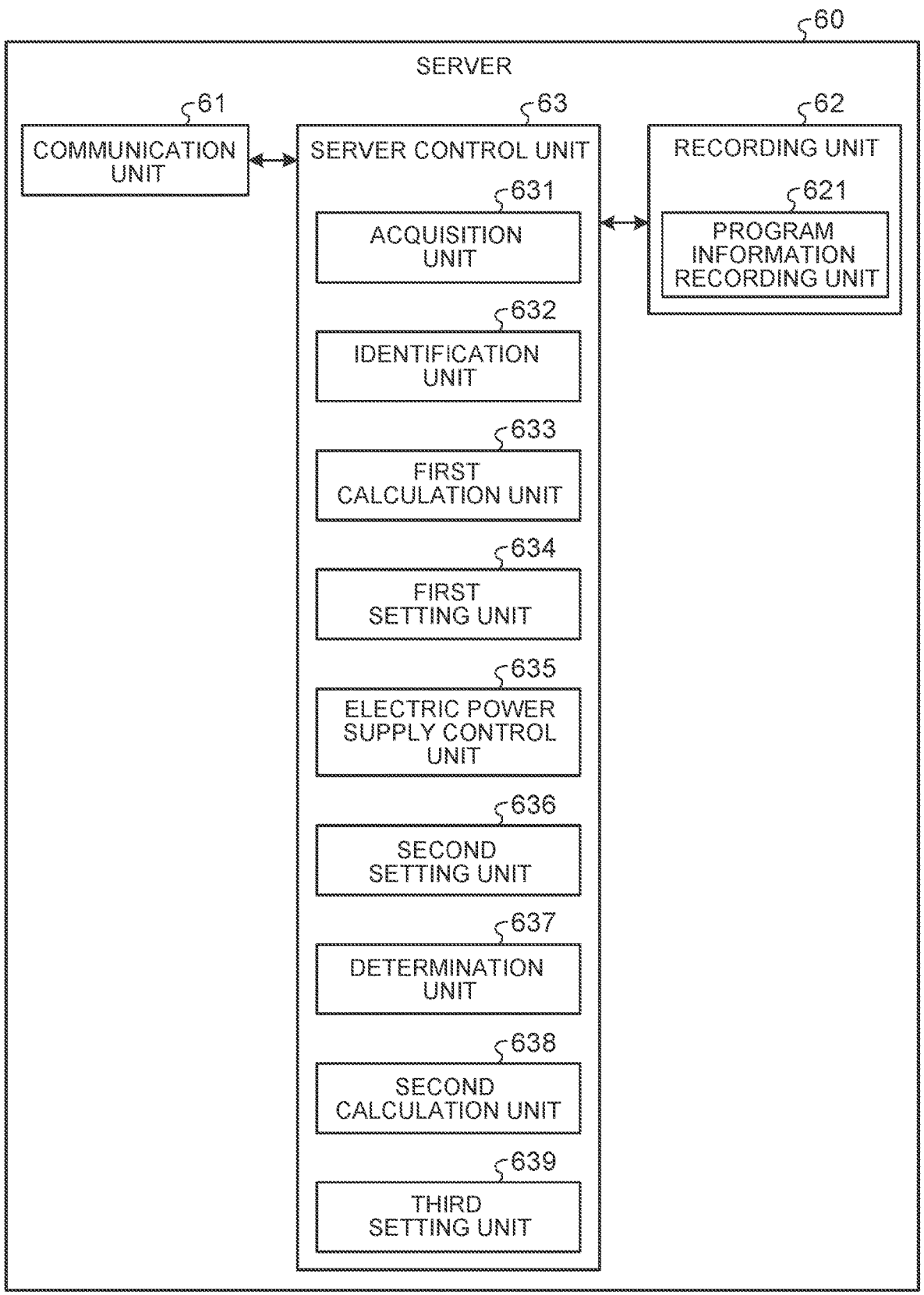
FIG. 4 is a block diagram showing a functional configuration of a server according to the first embodiment.

Next, the functional configuration of the server 60 will be described. FIG. 4 is a block diagram showing the functional configuration of the server 60.

As shown in FIG. 4, the server 60 includes a communication unit 61, a recording unit 62, and a server control unit 63.

Under the control of the server control unit 63, the communication unit 61 receives various types of information from the vehicles $10_1$ to $10_n$, the charge-discharge device 20, and the communication terminals $50_1$ to $50_n$ via the network NW. Further, under the control of the server control unit 63, the communication unit 61 transmits various types of information to the vehicles $10_1$ to $10_n$, the charge-discharge device 20, and the communication terminals $50_1$ to $50_n$. The communication unit 61 is configured using a communication module or the like capable of transmitting and receiving various types of information.

The recording unit 62 records various types of information related to the server. The recording unit 62 includes a program recording unit 621 that executes various programs executed by the server 60. The recording unit 62 is configured using a DRAM, a ROM, a flash memory, an HDD, an SSD, or the like.

The server control unit 63 controls each unit constituting the server 60. The server control unit 63 is configured using a memory and a processor provided with hardware such as a CPU. The server control unit 63 includes an acquisition unit 631, an identification unit 632, a first calculation unit 633, a first setting unit 634, an electric power supply control unit 635, a second setting unit 636, a determination unit 637, a second calculation unit 638, and a third setting unit 639.

The acquisition unit 631 communicates with each of the vehicles $10_1$ to $10_n$ via the second external communication unit 119, and acquires the electric power supply information and the vehicle model information from each of the vehicles $10_1$ to $10_n$. Further, the acquisition unit 631 acquires the remaining amount of the predetermined fuel from the vehicle 10 provided with the electric power generation function that is identified by the identification unit 632.

The identification unit 632 identifies the vehicle 10 provided with the electric power generation function based on the vehicle model information of the vehicles $10_1$ to $10_n$ acquired by the acquisition unit 631.

The first calculation unit 633 calculates an electric power generation amount of the vehicle 10 provided with the electric power generation function based on the remaining amount of fuel of the vehicle 10 provided with the electric power generation function and the vehicle model information acquired by the acquisition unit 631.

The first setting unit 634 sets the electric energy to be supplied by each vehicle 10 based on the electric power supply information from each of the vehicles $10_1$ to $10_n$, the vehicle model information of each of vehicles $10_1$ to $10_n$, and the electric power generation amount of the vehicle 10 provided with the electric power generation function calculated by the first calculation unit 633. Specifically, the first setting unit 634 sets the electric energy to be supplied by each vehicle 10 per hour such that the end time when each vehicle 10 ends electric power supply is within a predetermined time.

The electric power supply control unit 635 starts electric power supply by each vehicle 10 based on the electric energy of each vehicle 10 set by the first setting unit 634.

The second setting unit 636 sets the route order of a supply vehicle (not shown) for refueling the vehicle 10 based on the importance of each facility 40 acquired by the acquisition unit 631.

The determination unit 637 determines whether the supply vehicle (not shown) has arrived at the facility 40 based on the position information of the supply vehicle.

The second calculation unit 638 calculates a consumption rate of fuel in each vehicle 10 at the facility 40 where the supply vehicle arrives. Specifically, the second calculation unit 638 calculates the consumption rate of fuel based on the performance of the generator 102 and the engine 101 included in the vehicle model information of each vehicle 10 and the remaining amount of fuel.

The third setting unit 639 sets the refueling order of each vehicle 10 based on the remaining amount of fuel in each vehicle 10 at the facility 40 where the supply vehicle arrives and the consumption rate of fuel calculated by the second calculation unit 638, and outputs the refueling order of each vehicle 10 to the display unit 120e of each vehicle 10 or the communication terminal 50 associated with each vehicle 10.

Process Executed by Server

Figure 5:
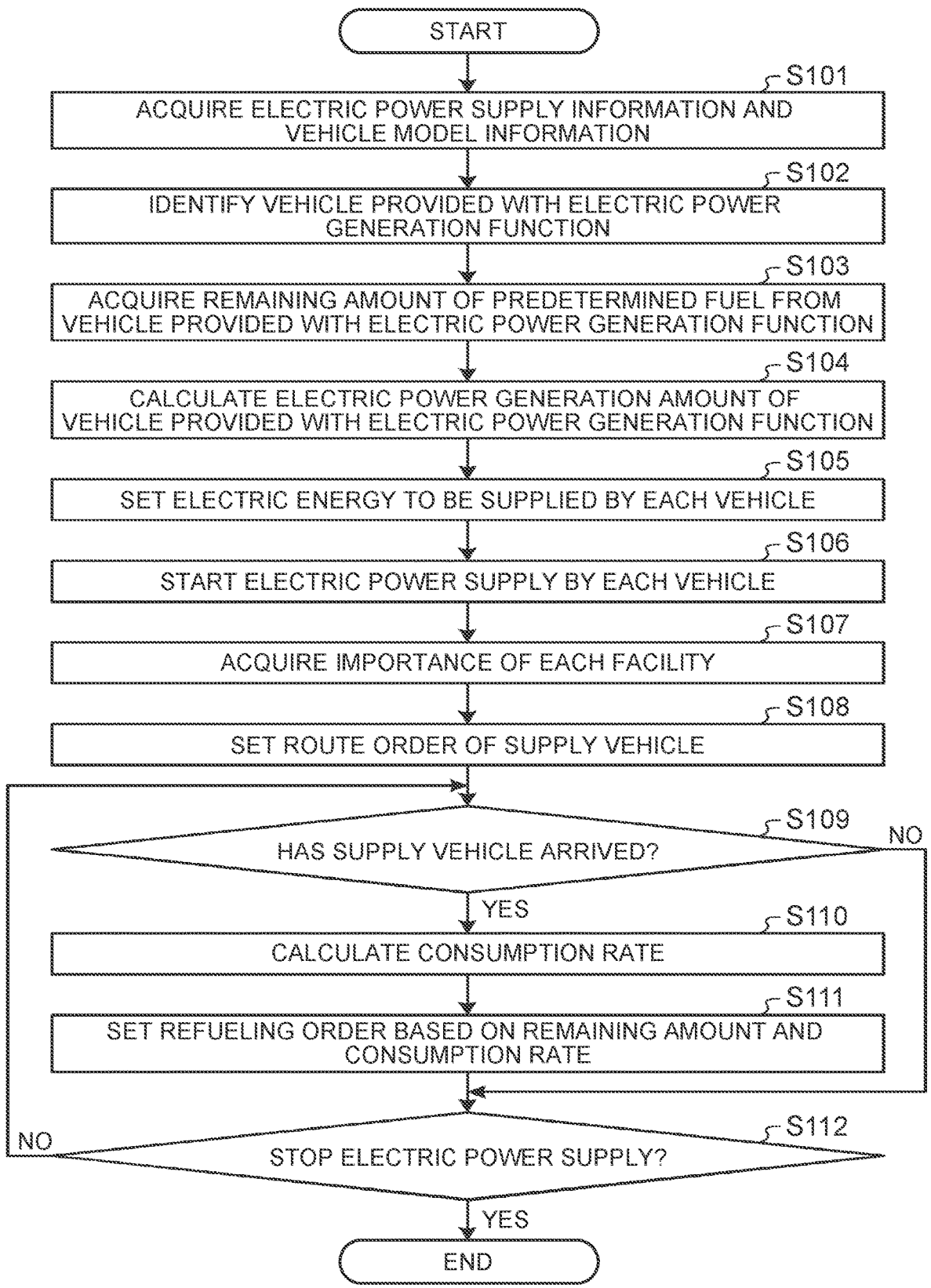
FIG. 5 is a flowchart showing an outline of a process executed by the server according to the first embodiment.

Next, the process executed by the server 60 will be described. FIG. 5 is a flowchart showing an outline of the process executed by the server 60.

As shown in FIG. 5, first, the acquisition unit 631 communicates with each of the vehicles $10_1$ to $10_n$ via the second external communication unit 119, and acquires the electric power supply information and the vehicle model information from each of the vehicles $10_1$ to $10_n$ (step S101).

Subsequently, the identification unit 632 identifies the vehicle 10 provided with the electric power generation function based on the vehicle model information of the vehicles $10_1$ to $10_n$ acquired by the acquisition unit 631 (step S102). Specifically, the identification unit 632 identifies any of HEV, PHEV, and FCEV as the vehicle 10 provided with the electric power generation function based on the vehicle model information of the vehicles $10_1$ to $10_n$ acquired by the acquisition unit 631.

After that, the acquisition unit 631 acquires the remaining amount of the predetermined fuel from the vehicle 10 provided with the electric power generation function that is identified by the identification unit 632 (step S103).

Subsequently, the first calculation unit 633 calculates the electric power generation amount of the vehicle 10 provided with the electric power generation function based on the remaining amount of fuel of the vehicle 10 provided with the electric power generation function and the vehicle model information acquired by the acquisition unit 631 (step S104). Specifically, the first calculation unit 633 calculates the electric power generation amount based on the remaining amount of fuel of the vehicle 10 provided with the electric power generation function and the performance of the generator 102 and the engine 101 included in the vehicle model information. In this case, the first calculation unit 633 calculates the electric power generation amount with the highest electric power generation efficiency based on the remaining amount of fuel of the vehicle 10 provided with the electric power generation function and the performance of the generator 102 and the engine 101 included in the vehicle model information. The first calculation unit 633 may calculate the maximum electric power generation amount based on the remaining amount of fuel of the vehicle 10 provided with the electric power generation function and the performance of the generator 102 and the engine 101 included in the vehicle model information.

After that, the first setting unit 634 sets the electric energy to be supplied by each vehicle 10 based on the electric power supply information from each of the vehicles $10_1$ to $10_n$, the vehicle model information of each of vehicles $10_1$ to $10_n$, and the electric power generation amount of the vehicle 10 provided with the electric power generation function calculated by the first calculation unit 633 (step S105). Specifically, to suppress an electric power supply load by each vehicle 10 from being biased, the first setting unit 634 sets the electric energy to be supplied by each vehicle 10 per hour such that the end time when each vehicle 10 ends the electric power supply is within a predetermined time.

Subsequently, the electric power supply control unit 635 starts electric power supply by each vehicle 10 based on the electric energy of each vehicle 10 set by the first setting unit 634 (step S106).

After that, the acquisition unit 631 acquires the importance of each facility to which each vehicle 10 is supplying electric power (step S107). Here, the importance is set to a value based on the type of facility. For example, when the facility is an important facility such as a hospital or city hall, the highest value is set, and when the facility is a school or public hall, a lower value is set as compared with the important facility.

Subsequently, the second setting unit 636 sets a route order of the supply vehicle (not shown) for refueling the vehicle 10 based on the importance of each facility 40 acquired by the acquisition unit 631 (step S108).

After that, the determination unit 637 determines whether the supply vehicle (not shown) has arrived at the facility 40 based on the position information of the supply vehicle (step S109). When the determination unit 637 determines that the supply vehicle has arrived at the facility 40 (step S109: Yes), the server 60 proceeds to step S110 that will be described later. On the other hand, when the determination unit 637 determines that the supply vehicle has not arrived at the facility 40 (step S109: No), the server 60 proceeds to step S112 that will be described later.

Subsequently, the second calculation unit 638 calculates the consumption rate of fuel in each vehicle 10 at the facility 40 where the supply vehicle arrives (step S110). Specifically, the second calculation unit 638 calculates the consumption rate of fuel based on the performance of the generator 102 and the engine 101 included in the vehicle model information of each vehicle 10 and the remaining amount of fuel.

After that, the third setting unit 639 sets the refueling order of each vehicle 10 based on the remaining amount of fuel in each vehicle 10 at the facility 40 where the supply vehicle arrives and the consumption rate of fuel calculated by the second calculation unit 638 (step S111). In this case, the third setting unit 639 outputs the refueling order of each vehicle 10 to the display unit 120e of each vehicle 10 or the communication terminal 50 associated with each vehicle 10. With the above, the user of each vehicle 10 can refuel the vehicle 10 in accordance with the refueling order. As a result, the time for supplying electric power to the facility 40 can be extended.

Subsequently, the determination unit 637 determines whether electric power supply from each vehicle 10 to the facility 40 is stopped (step S112). Specifically, the determination unit 637 determines whether a stop signal for stopping electric power supply is input from the vehicles $10_1$ to $10_n$, and when the stop signal is input, the determination unit 637 determines that the electric power supply to the facility 40 by each vehicle 10 is stopped. When the determination unit 637 determines that electric power supply from each vehicle 10 to the facility 40 is stopped (step S112: Yes), the server 60 terminates this process. On the other hand, when the determination unit 637 determines that electric power supply from each vehicle 10 to the facility 40 is not stopped (step S112: No), the server 60 returns to step S109.

According to the first embodiment described above, the server control unit 63 acquires the electric power supply information indicating the electric energy that can be supplied to the outside by each of the vehicles $10_1$ to $10_n$, and sets the electric energy to be supplied to the facility 40 by each of the vehicles $10_1$ to $10_n$ based on the electric power supply information on each of the vehicles $10_1$ to $10_n$. After that, the server control unit 63 causes each of the vehicles $10_1$ to $10_n$ to supply electric power based on the electric energy set for each of the vehicles $10_1$ to $10_n$. This makes it possible to efficiently supply electric power to the facility 40 using the vehicles $10_1$ to $10_n$.

Further, according to the first embodiment, the server control unit 63 acquires the vehicle model information indicating the vehicle model of each of the vehicles $10_1$ to $10_n$, identifies the vehicle 10 provided with the electric power generation function using the predetermined fuel from among the vehicles $10_1$ to $10_n$ based on the vehicle model information, acquires the remaining amount of the predetermined fuel from the vehicle 10 provided with the electric power generation function, and sets the electric energy for each of the vehicles $10_1$ to $10_n$ based on the remaining amount of fuel of the vehicle 10 provided with the electric power generation function, the vehicle model information of each of the vehicles $10_1$ to $10_n$, and the electric power supply information of the vehicles $10_1$ to $10_n$. With the above, it is possible to efficiently and safely supply electric power to the facility 40 using the vehicles $10_1$ to $10_n$ in consideration of electric power generation of the vehicle 10 provided with the electric power generation function, and it is also possible to equalize the load of the electric power supply.

Further, according to the first embodiment, the server control unit 63 calculates the electric power generation amount that can be generated for each vehicle 10 provided with the electric power generation function based on the remaining amount of fuel of each vehicle 10 provided with the electric power generation function and the vehicle model information of each vehicle 10 provided with the electric power generation function, and sets the electric energy for each of the vehicles $10_1$ to $10_n$ based on the calculated electric power generation amount, the vehicle model information of each of the vehicles $10_1$ to $10_n$, and the electric power supply information of the vehicles $10_1$ to $10_n$. With the above, it is possible to efficiently supply electric power to the facility 40 using the vehicles $10_1$ to $10_n$ in consideration of the electric power generation amount by the vehicle 10 provided with the electric power generation function.

Further, according to the first embodiment described above, the server control unit 63 sets the electric energy to be supplied by each of the vehicles $10_1$ to $10_n$ based on the electric power generation amount of the vehicle 10 provided with the electric power generation function and the electric power supply information on each of the vehicles $10_1$ to $10_n$ such that an electric power supply time during which each of the vehicles $10_1$ to $10_n$ supplies electric power is within a predetermined time. With the above, it is not necessary to replace each vehicle 10, and is also not necessary to stop electric power supply to the facility 40 and connect a new vehicle 10 to the facility 40 in each case. Therefore, the electric power can be efficiently supplied to the facility 40, and further, it is possible to suppress an instantaneous voltage drop.

Further, according to the first embodiment, the server control unit 63 sets the refueling order for refueling each of the vehicles $10_1$ to $10_n$ by the supply vehicle based on the remaining amount of fuel of each vehicle 10 provided with the electric power generation function, and outputs the refueling order to each of the vehicles $10_1$ to $10_n$. With the above, the user of the vehicle 10 provided with the electric power generation function can easily understand the refueling timing of fuel.

Further, according to the first embodiment, the server control unit 63 calculates the consumption rate of fuel of the vehicle 10 provided with the electric power generation function based on the vehicle model information of each of the vehicles $10_1$ to $10_n$ and the electric power supply information of each of the vehicles $10_1$ to $10_n$, and sets the refueling order by the supply vehicle based on the calculated consumption rate and the remaining amount of fuel of the vehicle 10 provided with the electric power generation function. This makes it possible to set the refueling order of the fuel in the order in which the fuel consumption is reflected in real time.

Further, according to the first embodiment, the server control unit 63 sets the route order in which the supply vehicle travels based on the importance set to the facility 40. Therefore, the supply vehicle can be dispatched in the order corresponding to the facility 40.

Second Embodiment

Hereinafter, a second embodiment will be described. In the first embodiment, the server 60 sets the electric energy of each vehicle 10. However, in the second embodiment, the ECU mounted on the vehicle sets the electric energy to be supplied to the facility 40 by each vehicle 10. That is, in the second embodiment, the vehicle has a different configuration from the vehicle 10 according to the first embodiment. Hereinafter, the vehicle according to the second embodiment will be described. Note that, the same configuration as that of the electric power system 1 according to the first embodiment is designated by the same reference symbol, and detailed description thereof will be omitted.

Functional Configuration of Vehicle

Figure 6:
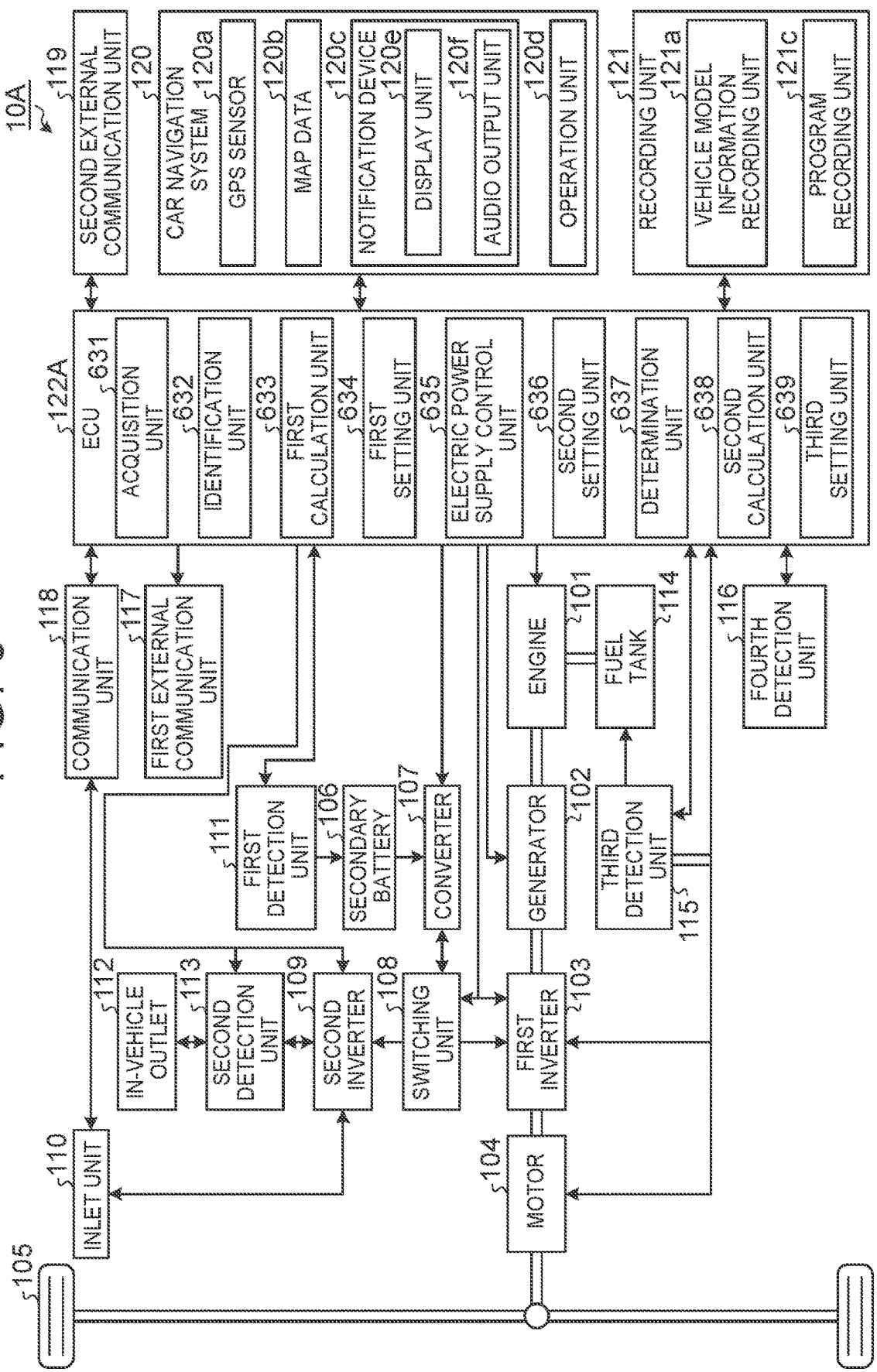
FIG. 6 is a block diagram showing a functional configuration of a vehicle according to a second embodiment.

FIG. 6 is a block diagram showing the functional configuration of a vehicle according to a second embodiment. A vehicle 10A shown in FIG. 2 includes an ECU 122A instead of the ECU 122 of the vehicle 10 according to the first embodiment. The ECU 122A has the same function as the server control unit 63 of the server 60. Specifically, the ECU 122A includes the acquisition unit 631, the identification unit 632, the first calculation unit 633, the first setting unit 634, the electric power supply control unit 635, the second setting unit 636, the determination unit 637, the second calculation unit 638, and the third setting unit 639. The ECU 122A acquires the electric power supply information indicating the electric energy that can be supplied to the outside by each of a plurality of vehicles $10A_1$ to $10A_n$, sets the electric energy to be supplied to the facility 40 by each of the vehicles $10A_1$ to $10A_n$ based on the electric power supply information of each of the vehicles $10A_1$ to $10A_n$, and causes each of the vehicles $10A_1$ to $10A_n$ to supply electric power based on the set electric energy. Note that, in the second embodiment, the ECU 122A functions as a control device.

According to the second embodiment described above, similarly to the first embodiment, it is possible to efficiently supply electric power to the facility 40 using the vehicles $10A_1$ to $10A_n$.

Note that, in the second embodiment, the ECU 122A functions as a control device. However, the present disclosure is not limited to this, and for example, the function of the ECU 122A may be provided in the charge-discharge control unit 25.

Other Embodiments

Further, in the first and second embodiments, the above-mentioned "unit" can be read as "circuit" or the like. For example, the control unit can be read as a control circuit.

Further, the program to be executed by the electric power system according to the first and second embodiments is stored and provided as file data in an installable format or an executable format in a computer-readable recording medium (storage medium) such as a compact disc (CD)-ROM, a flexible disk (FD), a compact disc-recordable (CD-R), a digital versatile disk (DVD), universal serial bus (USB) media, or flash memory.

The program to be executed by the electric power system according to the first and second embodiments may be configured to be stored in a computer connected to a network such as the Internet and provided through downloading via the network.

Note that, in the description of the flowchart in the present specification, the order of the processing between steps is clarified using expressions such as "first", "after that", and "subsequently". However, the order of processing required for realizing the embodiment is not always uniquely defined by those representations. That is, the order of processing in the flowchart described in the present specification can be changed within a consistent range.

Further effects and modifications can be easily derived by those skilled in the art. The broader aspects of the disclosure are not limited to the particular details and representative embodiments shown and described above. Accordingly, various modifications can be made without departing from the spirit or scope of the general inventive concept as defined by the appended claims and their equivalents.

What is claimed is:

1. A server comprising a processor configured to:
   acquire electric power supply information indicating electric energy that is suppliable by each of a plurality of vehicles to outside;
   set electric energy to be supplied to a facility by each of the vehicles based on the electric power supply information of each of the vehicles;
   cause each of the vehicles to supply electric power based on the electric energy;
   acquire vehicle model information indicating a vehicle model of each of the vehicles;
   identify the vehicle provided with an electric power generation function using predetermined fuel from among the vehicles based on the vehicle model information;
   acquire a remaining amount of the predetermined fuel from the vehicle provided with the electric power generation function;

calculate an electric power generation amount that is able to be generated for each of the vehicles provided with the electric power generation function based on the remaining amount of each of the vehicles provided with the electric power generation function and the vehicle model information of each of the vehicles provided with the electric power generation function; and set the electric energy based on the remaining amount of the vehicle provided with the electric power generation function, the electric power generation amount, the vehicle model information, and the electric power supply information.

2. The server according to claim 1, wherein the processor sets the electric energy based on the electric power generation amount and the electric power supply information such that an electric power supply time during which each of the vehicles supplies electric power is within a predetermined time.

3. The server according to claim 2, wherein the processor:
sets a refueling order by a supply vehicle that refuels each of the vehicles with the fuel based on the remaining amount of each of the vehicles provided with the electric power generation function; and
outputs the refueling order to each of the vehicles.

4. The server according to claim 3, wherein the processor:
calculates a consumption rate of the fuel in the vehicle provided with the electric power generation function based on the vehicle model information and the electric power supply information; and
sets the refueling order based on the consumption rate and the remaining amount.

5. The server according to claim 4, wherein a route order in which the supply vehicle travels is set based on an importance set to the facility.

6. A control device comprising a processor configured to:
acquire electric power supply information indicating electric energy that is suppliable by each of a plurality of vehicles to outside;
set electric energy to be supplied to a facility by each of the vehicles based on the electric power supply information of each of the vehicles;
cause each of the vehicles to supply electric power based on the electric energy;
acquire vehicle model information indicating a vehicle model of each of the vehicles;
identify the vehicle provided with an electric power generation function using predetermined fuel from among the vehicles based on the vehicle model information;
acquire a remaining amount of the predetermined fuel from the vehicle provided with the electric power generation function;
calculate an electric power generation amount that is able to be generated for each of the vehicles provided with the electric power generation function based on the remaining amount of each of the vehicles provided with the electric power generation function and the vehicle model information of each of the vehicles provided with the electric power generation function; and
set the electric energy based on the remaining amount of the vehicle provided with the electric power generation function, the electric power generation amount, the vehicle model information, and the electric power supply information.

7. The control device according to claim 6, wherein the processor sets the electric energy based on the electric power generation amount and the electric power supply information such that an electric power supply time during which each of the vehicles supplies electric power is within a predetermined time.

8. The control device according to claim 7, wherein the processor:
sets a refueling order by a supply vehicle that refuels each of the vehicles with the fuel based on the remaining amount of each of the vehicles provided with the electric power generation function; and
outputs the refueling order to each of the vehicles.

9. The control device according to claim 8, wherein the processor:
calculates a consumption rate of the fuel in the vehicle provided with the electric power generation function based on the vehicle model information and the electric power supply information; and
sets the refueling order based on the consumption rate and the remaining amount.

10. The control device according to claim 9, wherein a route order in which the supply vehicle travels is set based on an importance set to the facility.

11. A non-transitory storage medium storing a program that causes a processor to:
acquire electric power supply information indicating electric energy that is suppliable by each of a plurality of vehicles to outside;
set electric energy to be supplied to a facility by each of the vehicles based on the electric power supply information of each of the vehicles;
cause each of the vehicles to supply electric power based on the electric energy;
acquire vehicle model information indicating a vehicle model of each of the vehicles;
identify the vehicle provided with an electric power generation function using predetermined fuel from among the vehicles based on the vehicle model information;
acquire a remaining amount of the predetermined fuel from the vehicle provided with the electric power generation function;
calculate an electric power generation amount that is able to be generated for each of the vehicles provided with the electric power generation function based on the remaining amount of each of the vehicles provided with the electric power generation function and the vehicle model information of each of the vehicles provided with the electric power generation function; and
set the electric energy based on the remaining amount of the vehicle provided with the electric power generation function, the electric power generation amount, the vehicle model information, and the electric power supply information.

12. The non-transitory storage medium according to claim 11, wherein the program causes the processor to set the electric energy based on the electric power generation amount and the electric power supply information such that an electric power supply time during which each of the vehicles supplies electric power is within a predetermined time.

13. The non-transitory storage medium according to claim 12, wherein the program causes the processor to:
set a refueling order by a supply vehicle that refuels each of the vehicles with the fuel based on the remaining amount of each of the vehicles provided with the electric power generation function; and
output the refueling order to each of the vehicles.

14. The non-transitory storage medium according to claim 13, wherein the program causes the processor to:
  calculate a consumption rate of the fuel in the vehicle provided with the electric power generation function based on the vehicle model information and the electric power supply information; and
  set the refueling order based on the consumption rate and the remaining amount.

* * * * *